(12) United States Patent
Perticone et al.

(10) Patent No.: US 8,345,812 B2
(45) Date of Patent: Jan. 1, 2013

(54) DISTINGUISHING BETWEEN CLASSES OF FISSIONABLE MATERIAL

(75) Inventors: David Perticone, Winchester, MA (US); Vitaliy Ziskin, Brighton, MA (US)

(73) Assignee: L-3 Communications Security and Detection Systems, Inc., Woburn, MA (US)

( * ) Notice: Subject to any disclaimer, the term of this patent is extended or adjusted under 35 U.S.C. 154(b) by 676 days.

(21) Appl. No.: 12/426,172

(22) Filed: Apr. 17, 2009

(65) Prior Publication Data

US 2009/0262882 A1 Oct. 22, 2009

Related U.S. Application Data

(60) Provisional application No. 61/052,072, filed on May 9, 2008, provisional application No. 61/045,997, filed on Apr. 18, 2008.

(51) Int. Cl.
*G21G 1/08* (2006.01)
(52) U.S. Cl. .......................... 376/170; 376/153; 376/159
(58) Field of Classification Search ......................... None
See application file for complete search history.

(56) References Cited

U.S. PATENT DOCUMENTS

| | | | |
|---|---|---|---|
| 3,456,113 A | 7/1969 | Keepin | |
| 3,993,910 A | 11/1976 | Parkin et al. | |
| 7,151,815 B2 * | 12/2006 | Ruddy et al. | 376/158 |
| 7,277,521 B2 | 10/2007 | Norman et al. | |
| 2004/0258189 A1 | 12/2004 | Norman et al. | |
| 2006/0227920 A1 * | 10/2006 | Maglich | 376/158 |
| 2007/0001123 A1 | 1/2007 | Andrews et al. | |
| 2007/0102640 A1 | 5/2007 | Ing et al. | |
| 2007/0263767 A1 * | 11/2007 | Brondo, Jr. | 378/57 |
| 2008/0014643 A1 | 1/2008 | Bjorkholm | |

OTHER PUBLICATIONS

Evans, Albert E., "The expaning role of the small Van de Graaff in Nuclear Nondestructive Analysis", IEEE Transactions on nuclear science, vol. 20, issue 3, pp. 989-993 (Jun. 1973).*
'Thorium One—History,' copyright 2012 Thorium One Ltd., reprinted from http://thorium1.com/thorium101/history.html on Feb. 27, 2012, 2 pages.
Hall, J.M., et al., "The Nuclear Car Wash: Neutron Interrogation of Cargo Containers to Detect Hidden SNM," *Nuclear Instruments and Methods in Physics Research B*, vol. 261, 2007, pp. 337-340, reprinted from www.sciencedirect.com.
International Search Report and Written Opinion for corresponding International Application No. PCT/US09/41048, mailed Jul. 27, 2009, 10 pages.

\* cited by examiner

*Primary Examiner* — Johannes P Mondt
(74) *Attorney, Agent, or Firm* — Fish & Richardson P.C.

(57) ABSTRACT

A first pulsed beam of charged particles from a particle accelerator is accelerated toward a first target that is configured to emit a fast neutron beam in response to being struck by an accelerated particle such that the fast neutron beam is directed toward a physical region. The last neutron beam includes a neutron having an energy sufficient to cause fission in a fissionable material. Data from a sensor configured to detect radiation of a fission product is accessed, and before accelerating a second pulsed beam of charged particles, whether the physical region includes a fissionable material based on the data from the sensor is determined.

23 Claims, 6 Drawing Sheets

DISTINGUISHING BETWEEN CLASSES OF FISSIONABLE MATERIAL

CROSS-REFERENCE TO RELATED APPLICATION

This application claims priority to U.S. Provisional Application Ser. No. 61/045,997, titled IDENTIFYING NUCLEAR MATERIAL and filed on Apr. 18, 2008, and U.S. Provisional Application Ser. No. 61/052,072, titled IMAGING SYSTEM and filed on May 9, 2008 both of which are herein incorporated by reference in their entirety.

TECHNICAL FIELD

This disclosure relates to distinguishing between classes of fissionable materials.

BACKGROUND

Fissionable materials produce fission products in response to being struck by accelerated particles having energy sufficient to cause fission in the material.

SUMMARY

In one general aspect, a system for detecting fissionable material includes a source configured to accelerate a pulsed beam of charged particles. The system also includes a first target configured to generate a fast neutron beam in response to being struck by an accelerated charged particle included in the pulsed beam of charged particles. The fast neutron beam includes neutrons having an energy sufficient to cause fission in a fissionable material. The system also includes a sensor configured to detect radiation from a fission product, and a processor coupled to a computer-readable storage medium. The medium stores instructions that, when executed, cause the processor to cause the source to accelerate a first pulsed beam of charged particles toward the first target such that a pulsed beam of fast neutrons is directed toward a physical region, receive data from the sensor indicating whether fission product radiation is emitted from the physical region, and determine, based on the data and before causing the source to accelerate a second pulsed beam of charged particles, whether the physical region includes a fissionable material.

Implementations may include one or more of the following features. An image may be generated based on attenuation of the fast neutron beam by the physical region. The generated image may be analyzed to identify regions that are not penetrated by the fast neutron beam. A region of interest that is located within the physical region may be received. Some of the fast neutron beam may have an energy greater than 1.5 MeV, and the slow neutron has an energy of less than 1.5 MeV.

In some implementations, the system may include a second target configured to generate a slow neutron in response to being struck by an accelerated particle from the source. The slow neutron having an energy sufficient to cause fission in a weaponizable material and insufficient to cause fission in a non-weaponizable material, and a second pulsed beam of charged particles may be directed toward the second target such that a pulsed beam of slow neutrons is directed toward the physical region. The second pulsed beam of charged particles may have the same energy as the particles in the first pulsed beam of charged particles. Data from the sensor that indicates detection of fission radiation resulting from the slow neutron interacting with the physical region may be received, and the region of interest may be determined to include a weaponizable material based on the data.

The system also may include a steering module configured to steer the accelerated pulsed beam of charged particles relative to the first target and the second target. The steering module may be a magnet configured to control a direction of the first pulse. The first target and the second target may be spatially separated from each other, and the steering module may steer the first pulse of charged particles to the first target to generate the fast neutron beam and the second pulse of charged particles to the second target to generate the slow neutron beam. The first target and the second target may be located along a target ladder that is a single piece. The first target and the second target may be the same material. The first target may be beryllium or deuterium, and the second target may carbon.

The system also may include a track along which the source moves relative to a region that includes the physical region.

In another general aspect, a first pulsed beam of charged particles from a particle accelerator is accelerated toward a first target that is configured to emit a fast neutron beam in response to being struck by an accelerated particle such that the fast neutron beam is directed toward a physical region. The fast neutron beam includes a neutron having an energy sufficient to cause fission in a fissionable material. Data from a sensor configured to detect radiation of a fission product is accessed, and before accelerating a second pulsed beam of charged particles, whether the physical region includes a fissionable material based on the data from the sensor is determined.

Implementations may include one or more of the following features. An image based attenuation of the fast neutron beam by the physical region may be generated. The image may be analyzed to identify regions of the physical region that are not penetrated by the fast neutron beam. A second pulsed beam of charged particles may be accelerated from the particle accelerator toward a second target configured to emit a slow neutron beam in response to being struck by an accelerated particle such that the slow neutron is directed toward the physical region. The slow neutron beam including a slow neutron having an energy sufficient to cause fission in a weaponizable material and insufficient to cause fission in a non-weaponizable material.

Data from the sensor indicating production of radiation of a fission product resulting from an interaction between the physical region and the slow neutron beam may be accessed, and, based on the data, it may be determined that the physical region includes weaponizable material based on the data. Accelerating the first pulsed beam of particles may include accelerating a deuteron. The weaponizable material may be a special nuclear material and the pulsed slow neutron beam may have an energy of 0.5 MeV or less. Accessing data from the sensor may include accessing data collected by the sensor ten milliseconds or more after the first pulse of accelerated particles is extinguished. In some implementations, if the physical region includes a fissionable material, a second pulsed beam of accelerated particles is accelerated toward a second target configured to emit a slow neutron beam toward the physical region in response to being struck by an accelerated particle, the slow neutron beam including a slow neutron having an energy sufficient to cause a weaponizable material to fission and insufficient to cause fission in non-weaponizable materials. It is determined whether the region of interest includes a weaponizable material.

A location of a region of interest that is within the physical region may be received. The source may be moved relative to the physical region such that the materials detection system scans the region of interest.

In another general aspect, an apparatus for generating a dual-energy neutron beam from an accelerator includes a source configured to accelerate a pulse of charged particles having a single energy, a first target configured to produce a pulse of neutrons of a first energy in response to being struck by a charged particle in the pulse of charged particles, and a second target made from a material different from the first target and configured to produce a pulse of neutrons of a second energy in response to being struck by a charged particle in the pulse of charged particles.

Implementations may include one or more of the following features. The charged particles may be deuterons, and the first target may be configured to produce a fast neutron beam in response to being struck by the charged particle, where the fast neutron beam includes neutrons having energy sufficient to cause fission in fissionable materials. The second target may configured to produce a slow neutron beam in response to being struck by the charged particle, and the slow neutron beam may include neutrons having energy sufficient to cause fission in weaponizable materials and insufficient to cause fission in non-weaponizable materials.

Implementations of any of the techniques described above may include a method, a process, a system, a device, an apparatus, or instructions stored on a computer-readable medium. The details of one or more implementations are set forth in the accompanying drawings and the description below. Other features will be apparent from the description and drawings, and from the claims.

DETAILED DESCRIPTION

A pulsed dual-energy neutron beam is used to probe a physical region, such the inside of a cargo container, to determine whether the physical region includes fissionable materials and/or weaponizable materials, such as special nuclear materials. The pulsed dual-energy neutron beam is generated from a single particle accelerator that accelerates a pulse of charged particles (such as deuterons, or protons) toward a target. The target produces a neutron in response to being struck by a particle included in the accelerated pulse of charged particles. Two targets, each of a different material, may be used such that a dual-energy neutron beam is created by using the single energy, single particle accelerator (such as a radio frequency quadrupole). As compared to techniques that use secondary targets to produce neutrons, the techniques discussed below produce neutrons directly through interactions between the particles from the source and the targets. This may result in more efficient production of neutrons and a higher flux neutron beam. Additionally, the techniques discussed below allow for detection of fission products between pulses from the accelerator.

The dual-energy neutron beam may be a train of pulses of "fast" neutrons that is followed by a train of pulse of "slow" neutrons. A train of pulses may include thousands of pulses, and a train of pulses may be referred to as a neutron pulse. "Fast" neutrons are neutrons that are energetic enough to cause fission in all, or almost all, fissionable materials. "Slow" neutrons are less energetic than "fast" neutrons and are only energetic enough to cause fission in weaponizable materials. In between the pulses of neutrons, data from a sensor that is configured to count fission products (e.g., neutrons and/or gamma rays that are produced upon fission of the material) and/or measure radiation from fission products determines whether a fissionable material and/or a weaponizable material is present in the physical region.

Because only weaponizable materials undergo fission when irradiated with the "slow" neutron pulse, by irradiating the physical region with the dual-energy neutron beam, weaponizable materials may be distinguished from fissionable materials that are non-weaponizable. Thus, the techniques discussed below may be used to distinguish between classes of fissionable materials and used to determine whether fissionable materials are present between pulses of a dual-energy neutron beam.

Additionally, the "fast" neutron beam is relatively intense and penetrates most objects. Thus, an image of the attenuation of the fast neutron beam caused by passing through the physical region shows most objects in the physical region. However, the "fast" neutron beam does not penetrate all materials, and these regions of non-penetration may show up as dark regions in an image that is based on the attenuation of the "fast" neutron. Identification of these regions of non-attenuation may provide an indication of materials of interest (such as the lead shielding that may be obscuring nuclear material) that require further manual investigation.

Figure 1A:
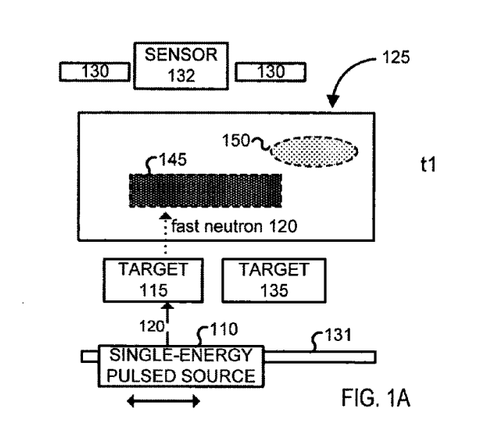
FIGS. 1A-D, 2A, 2B, 3A, and 3B are plan views of example systems for distinguishing between classes of fussionable materials.
Figure 1B:
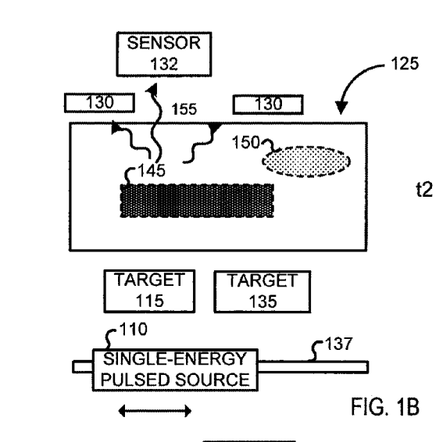

Referring to FIGS. 1A-1D, a plan view of an example system 100 for distinguishing weaponizable materials from fissionable materials is shown. Referring to FIG. 1A, at a time "t1," a pulsed beam of charged particles is created by accelerating a pulsed beam 105 of low-atomic number ions (e.g., deuterons, protons) from a source 10 toward a first target 115. The source 110 may be a particle accelerator. The target 115 is made of a material that generates neutrons 120 in response to being struck by the accelerated particles in the pulsed beam 105. Referring to FIG. 1B, at a time "t2," the source 110 no longer produces the pulsed beam 105 (e.g., the source 110 is off), but interactions between the neutrons 120 and a uranium object 145 produce delayed fission products 155. A sensor 130 senses the delayed fission products 165 before another pulse of neutrons is directed toward the physical region 125.

Because radiation of fission products is isotropic, the sensor 130 may include more than one sensor arranged along the physical region 125. The sensors in the sensor 130 may be, for example, spaced equidistant from each other in the vertical and/or horizontal direction with respect to the physical region 105. The sensors in the sensor 130 may be placed out of the path of the pulsed neutron beam 120 in order to minimize the occurrence of detection of fission radiation that comes from the pulsed neutron beam 120. An imaging sensor 132 is placed in the beam 120 and images the region 105, or a portion of the region 105, based on the attenuation of the pulsed neutron beam 120.

Figure 1C:
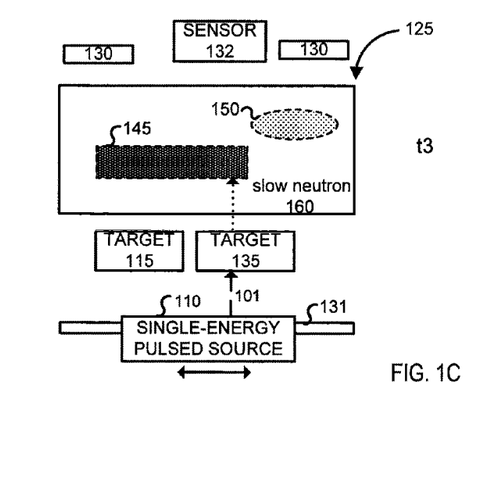
Figure 1D:
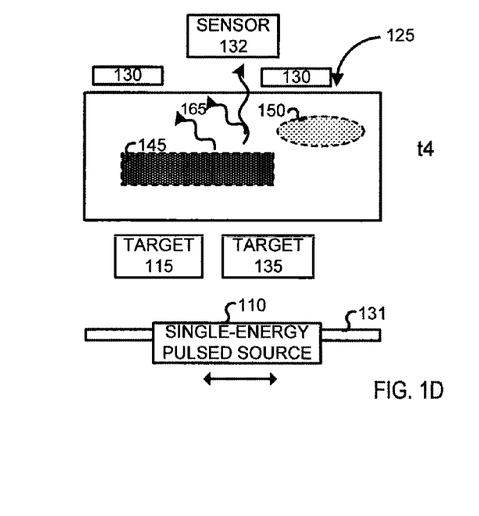
Figure 1E:
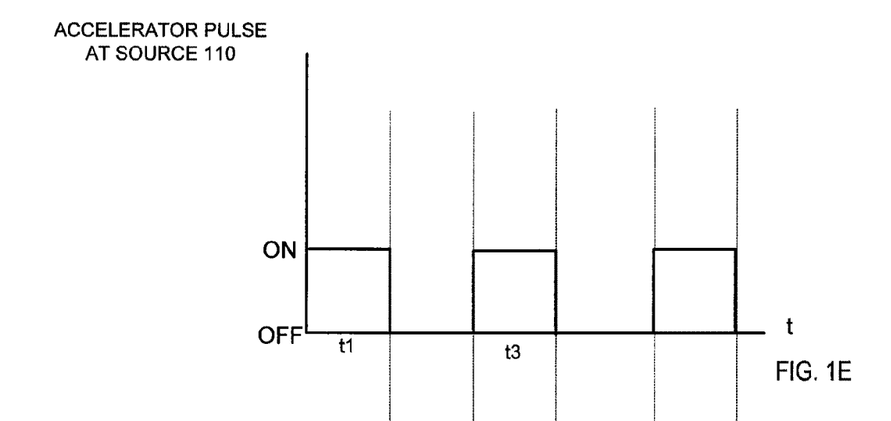
FIG. 1E shows an example timing diagram representing the output of a source that accelerates a pulsed beam of particles.
Figure 1F:
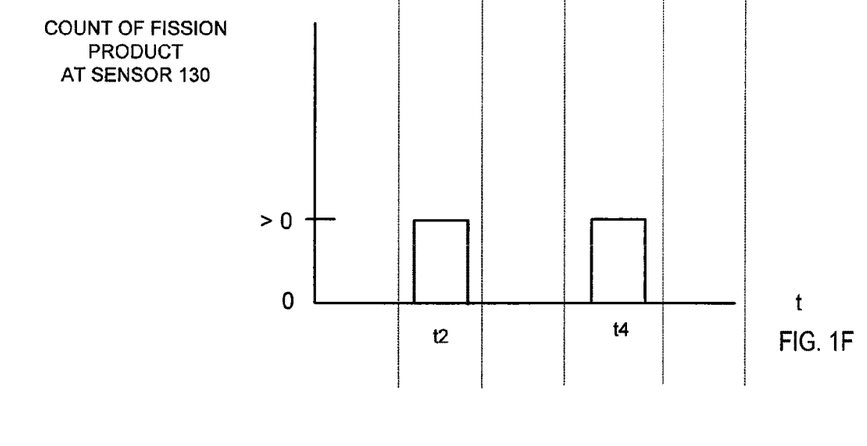
FIG. 1F shows an example timing diagram representing active detection cycles of a sensor configured to detect radiation from a source having characteristics shown in FIG. 1C.

FIGS. 1E and 1F show an illustration of the timing relationship between the sensor 130 and the pulsed beam from the source 110. As shown in FIG. 1E, at the time "t1," a pulsed beam is emitted from the source 110, and, as shown in FIG. 1F, at the time "t2," delayed fission products are detected by the sensor 130.

Referring to FIG. 1C, at a time "t3," another pulsed beam 107 of particles is accelerated from the source 110 toward a target 135. The pulsed beam 107 has the same energy as the pulsed beam 105, and the pulsed beam 107 comes from the same source 110 as the pulsed beam 105. The target 135 is made of a material that generates neutrons 160 in response to being struck by the accelerated particles in the pulsed beam 107. As discussed in more detail below, the target 135 is made from a different material than the target 115, and, thus the neutrons 160 have a different energy than the neutrons 120. In particular, the neutrons 120 may be "fast" neutrons and the neutrons 160 may be "slow" neutrons such that a dual-energy neutron beam is generated. Referring to FIG. 1D, at a time "t4," interactions between the neutrons 160 and the uranium object 145 produce delayed fission products 165, and the source II 0 no longer produces the pulsed beam 105. A sensor 130 senses the delayed fission products 165. Thus, because the interactions with both the "fast" neutron beam 120 and the "slow" neutron beam 165 produce fission products, the uranium object 145 is identified as likely to be a fissionable material and a weaponizable material.

In greater detail, fission is an exothermic reaction in which the nucleus of an atom splits into smaller parts. Fission may release energy as both electromagnetic radiation in the form of gamma rays and as kinetic energy in the form of free neutrons that are released from the fission reaction. Detection of delayed fission products (e.g., gamma rays and/or neutrons) from the region of interest indicates the presence of a fissionable material. The delayed fission products may be fission products that are emitted from the region of interest after the fission-inducing particles provided by the source have been extinguished.

The dual-energy neutron beam may include a "slow" neutron that causes fission only in special nuclear materials and a "fast" neutron beam that causes fission in all, or almost all, fissionable materials. The "slow" neutron may be a neutron or a neutron beam that includes neutrons having an energy less than a particular threshold energy, and no neutrons above the threshold energy. The threshold energy may be, for example, 1.2 Mega electron volts (MeV) or 0.5 MeV. Thus, in these examples, the "slow" neutron beam would include neutrons lower than 1.2 MeV or lower than 0.5 MeV, respectively. The detection of fission products after the "slow" neutron beam is no longer irradiating an object (e.g., between pulses of accelerated particles from the source 110) indicates the presence of a fissionable material that is also a special nuclear material. The dual-energy neutron source also includes a "fast" neutron that causes fission in all, or almost all, fissionable materials. The "fast" neutron beam may include neutrons that have energy greater than 1.2 MeV. In some examples, the "fast" neutron beam includes neutrons that have an energy of approximately 6 MeV. The "fast" neutron beam may include neutrons having an energy that could be considered "slow." For example, the "fast" neutron beam that includes neutrons having an energy greater than 1.2 MeV also may include neutrons having an energy less than 0.5 MeV.

The detection of a fission product after the "fast" neutron pulse is removed indicates that fissionable materials are present. Thus, the sensor counts fission products after a "fast" neutron pulse to determine whether fissionable materials are present in the region of interest, and the sensor counts fissionable products after the "slow" neutron pulse to determine whether special nuclear materials are present in the region of interest.

Accordingly, the techniques discussed below may help in the detection of special nuclear material and the detection of fissionable materials using a pulsed dual-energy neutron beam and detection of fission products between accelerator pulses (e.g., between the pulse train of "fast" neutrons and the pulse train of "slow" neutrons). Because both fissionable materials and special nuclear materials (a subset of fissionable materials) may be detected, the techniques discussed below may be used to distinguish weaponizable materials from other fissionable materials.

In greater detail, and referring to FIGS. 1A and 1B, at the time "t1," the pulsed beam of deuterons 105 is accelerated from the source 110 toward the target 115, and the pulse of "fast" neutrons 120 is generated and travels toward the physical region 125. The target 115 may be a material such as beryllium (Be) or deuterium (D). The physical region 125 includes the special nuclear material (SNM) object 145 and a uranium 238 (U-238) object 150. The SNM object 145 undergoes fission when irradiated with a "slow" neutron and when irradiated with a "fast" neutron. In contrast, the U-238 object 150 undergoes fission when irradiated with the "fast" neutron but not when irradiated with the "slow" neutron.

The pulse of "fast" neutrons 120 enters the physical region 125 and interacts with the SNM object 145. The physical region 125 may be surrounded by a container, and the "fast" and "slow" neutrons are energetic enough to penetrate the container. The interaction between the "fast" neutron pulse and the SNM object 145 produces fission products 155 that are sensed (or counted) at the sensor 130. The fission products 155 are delayed fission products that are present after the prompt fission products (which occur concurrently with or shortly after irradiation with the "fast" neutron pulse) have subsided. The delayed fission products may occur, for example, approximately 10 milliseconds (ms) after the end of the "fast" neutron pulse 120. Thus, the sensor 130 may be configured to count or otherwise detect fission products at a set time after the "fast" neutron pulse 120 ends. Sensing delayed fission products may help to improve performance by reducing the inadvertent counting of neutrons in the "fast" neutron beam itself as fission products that are produced as a result of fission. Thus, sensing the delayed fission products may reduce the false alarm rate of the system 100 as compared to a system that senses prompt fission products. The delayed fission products generated from the interactions between the "fast" neutron pulse and the SNM object 145 are detected by the sensor 130 and the presence of a fissionable material (in this example the SNM object 145) is registered before the source 110 accelerates a pulsed beam of deuterons 105 toward the target 135.

Thus, the system 100 may be considered to count, or otherwise detect, the presence of fissionable products in the physical region 125 between the pulses of accelerated particles from the source 110.

Referring to FIGS. 1C and D, at a time "t3," the source 110 accelerates a pulsed beam of deuterons 107 toward the target 135. As discussed above, the pulsed beam 107 is the same energy as the pulsed beam 105. As compared to the position of the source 110 in the examples of FIGS. 1A and 1B, at time "t3," the source 110 has moved such that the pulsed beam 107 aligns with the target 135. For example, the source 110 may move along a rail 137. The target 135 is made from a different material than the target 115, and, thus, the interactions between the target 135 and the accelerated particles produces neutrons having a different energy than the neutrons in the neutron pulse 120. For example, the target 135 may be made from carbon (C), and interactions between the target 135 and the accelerated particles may result in the generation of the "slow" neutron pulse 160.

The "slow" neutron pulse 160 enters the physical region 125 and interacts with the SNM object 145 to produce delayed fission products 165. The slow neutron pulse 160 enters the physical region 125 at approximately the same place that the fast neutron pulse 120 enters the physical region 125. The fission products include prompt fission products that occur concurrently with the irradiation of the SNM object 145 by the pulse 160 and shortly thereafter, and the delayed fission products 165 that are produced after the prompt fission products subside. Similar to the "fast" neutron beam pulse, the delayed fission products may be those fission products that are present approximately 10 ms after the "slow" neutron pulse 160 ends. The presence of the fission products 165 indicates that the object 145 is a SNM.

In contrast, the U-238 object 150 produces fission products in response to being irradiated with the "fast" neutron beam 120, but the U-238 object 150 does not produce fission products in response to being irradiated with the "slow" neutron beam 160. Thus, the U-238 object 150 and the SNM object 145 may be distinguished from each other because only the SNM object 145 produce fission products in response to the "slow" neutron beam 160. Accordingly, the system 100 may be used to determine whether the physical region 125 includes fissionable materials and whether the physical region 125 includes special nuclear materials. In cases where the physical region includes both fissionable materials and special nuclear materials, the system 100 may distinguish between the two.

In some implementations, the physical region 125 is probed with the "slow" neutron beam only after it is determined that the physical region 125 includes a fissionable material (e.g., by irradiating the physical region with the "fast" neutron beam). In these implementations, the source 110 accelerates a pulsed beam of deuterons toward the second target 135 only when fission products such as the fission products 155 are detected by the sensor 130. Only generating the "slow" neutron beam when fissionable materials are present may increase throughput of the system 100 and/or reduce the amount of dose the system 100 delivers.

Additionally, a portion of the physical region 125 that is identified as including fissionable material may be probed with the "slow" neutron beam repeatedly until fission is detected or until a predetermined amount of time has passed. This allows the system 100 to focus on portions of the physical region 125 that most likely include weaponizable materials. This may result in energy savings as compared to techniques that scan the entire physical region 125 with the "slow" neutron beam. Additionally, repeatedly probing the portion may improve performance by producing additional detector signal that allows for fission products to be detected from weaponizable materials that would not otherwise be detected.

Figure 2A:
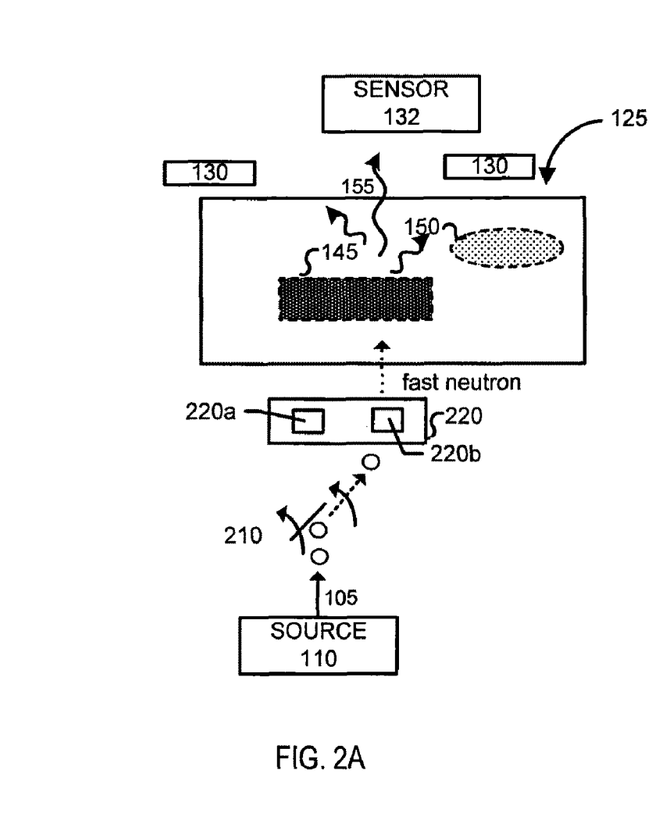
Figure 2B:
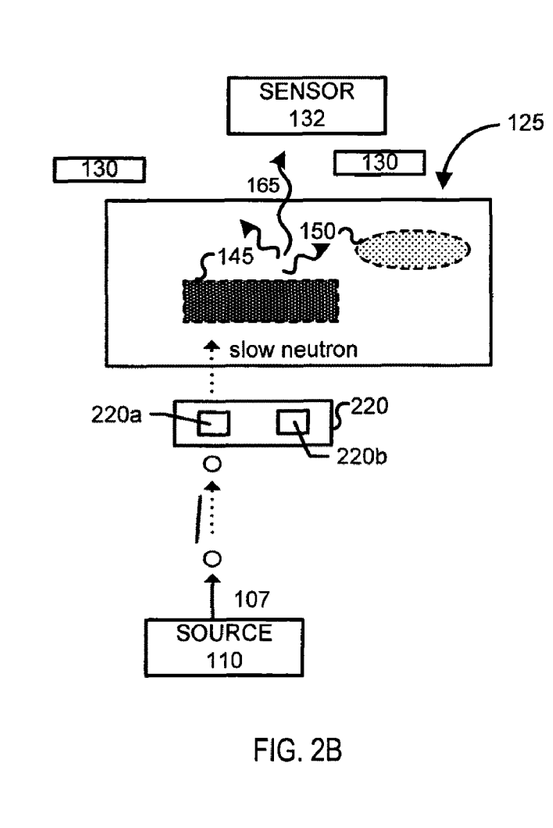

Referring to FIGS. 2A and 2B, a plan view of an another example system for identifying fissionable materials and for distinguishing special nuclear materials from fissionable materials is shown at two different times, "t5" and "t6." The system 200 is similar to the system 100 except the system 200 includes a beam steering module 210 that steers the beam of accelerated deuterons 105 along a target ladder 220 (or target track 220). The steering module 210 may be a magnet that is controllable to steer the beam 105 along the target ladder 220. The position of the beam 105 along the target ladder 220 may be determined by controlling and/or positioning the steering module 210.

The target ladder 220 includes targets 220a and 220b that spaced along the target ladder 220. The targets 220a and 220b are made from different materials. In the example shown in FIGS. 2A and 2B, interaction between the beam 105 and the target 220a creates a "fast" neutron beam, and the interaction between the beam 105 and the target 220b creates a "slow" neutron beam. The target 220a may be, for example, deuterium or beryllium, and the target 220b may be carbon.

The example target ladder 220 includes two targets; however, in other examples, the target ladder 220 may include more targets. For example, the target ladder may include both a deuterium target and a beryllium target in order to produce two different "fast" neutron beams as well as a carbon target to produce a "slow" neutron beam.

Continuing with the example shown in FIG. 2A, at the time "t5," a pulsed beam of deuterons 105 is accelerated from the source 110 and the steering module 210 steers the pulsed beam of deuterons 105 toward the target 220a to create a "fast" neutron pulse that interacts with the SNM object 145. After the "fast" neutron pulse ends, the delayed fission product 155 is detected at the sensor 130, indicating the presence of a fissionable material. At the time "t6," another pulsed beam of deuterons 107 is accelerated from the source 110 and the steering module 210 steers the pulsed beam 107 toward the target 220b to create a "slow" neutron pulse that interacts with the SNM object 145. Delayed fission products 165 are detected by the sensor 130 after the "slow" neutron pulse ends, thus indicating the presence of a SNM material.

Figure 3A:
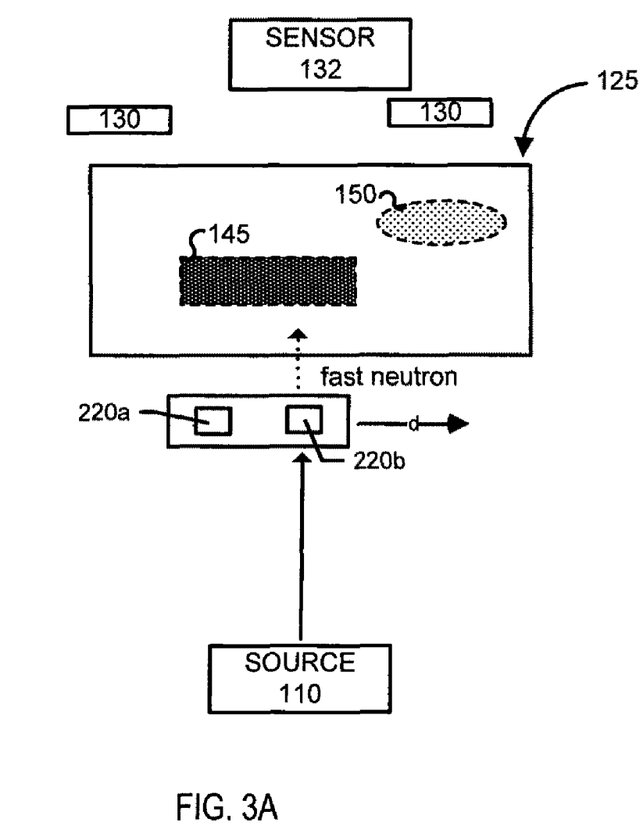
Figure 3B:
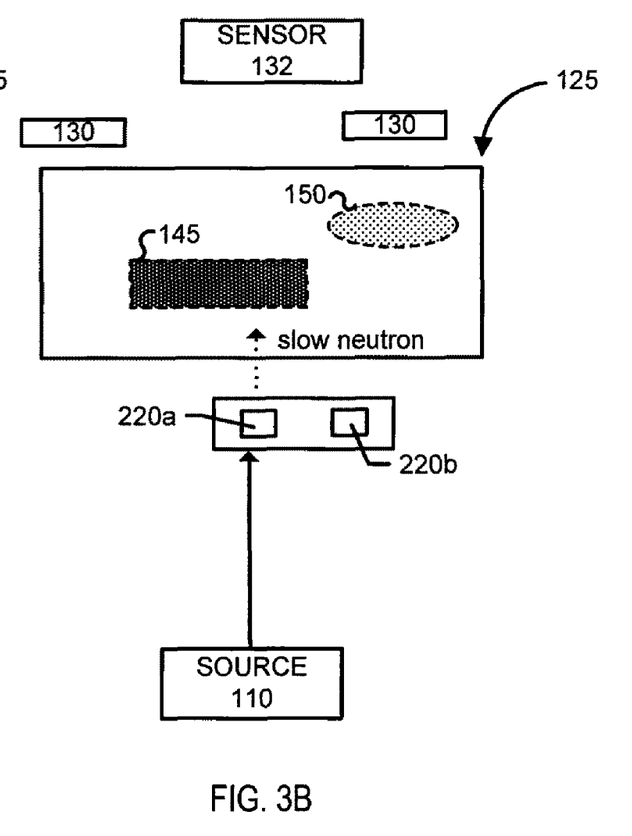

Referring to FIGS. 3A and 3B, a plan view of an another example system for distinguishing special nuclear materials from fissionable materials is shown at two different times, "t6" and "t7." The system 300 shown in FIGS. 3A and 3B is similar to the system 200 shown in FIGS. 2A and 2B, except the target ladder 220 moves relative to the source 110 and the physical region 125. Thus, in this example, instead of using a steering mechanism such as the steering module 210 to steer the beam from the source 110 along the target ladder 220 to select a target to irradiate, the target ladder 220 moves with respect to the source 110. In particular, referring to FIG. 3A, the target ladder 220 is positioned with the target 220a to receive the beam 105 from the source 110. Thus, a "fast" neutron beam is produced from the interaction between the beam 105 from the source 110 and the target 220a. Referring to FIG. 3B, at a time "t7," the target ladder 220 has moved along the direction "d" such that the target 220b is positioned to received the beam 107 from the source 110. Thus, a "slow" neutron beam is produced by the interaction of the beam 107 and the target 220b.

Figure 4:
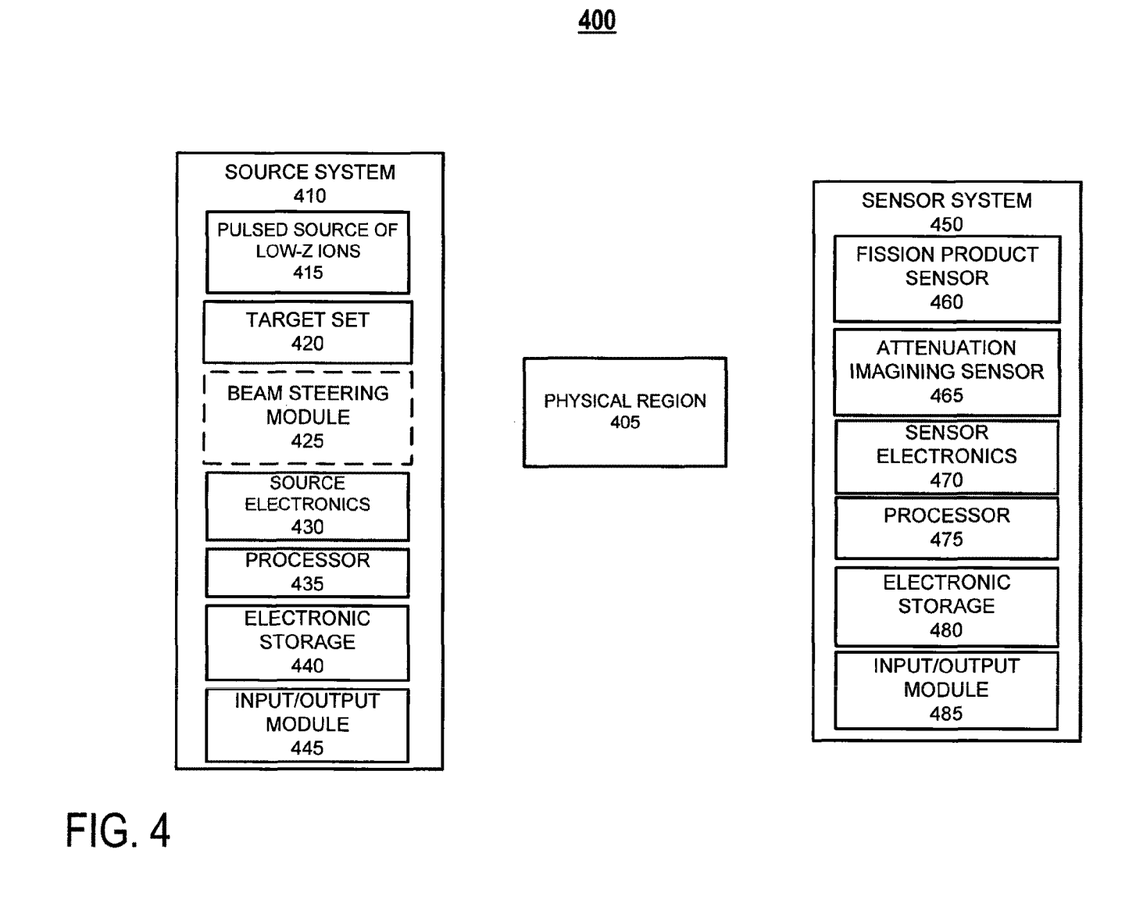
FIG. 4 shows a block diagram of a system for distinguishing between classes of fissionable materials.

FIG. 4 shows a block diagram of a system 400 used to distinguish special nuclear materials from fissionable materials. The system 400 may be similar to the systems 100, 200, and 300 discussed above. The system 400 includes a source system 410 and sensor system 450. Together, the source system 410 and the sensor system 450 determine whether a physical region 405 includes fissionable materials and whether the physical region 405 includes special nuclear materials. Additionally, the system 400 distinguishes between fissionable materials and special nuclear materials.

The source system 410 includes a source 415, a target set 420, a beam steering module 425, source electronics 430, a processor 435, an electronic storage 440, and an input/output module 445. The source 415 is a source that accelerates pulses of charged particles (such as deuterons) toward the target set 420. The source 412 may be similar to the source 110 discussed with respect to FIGS. 1A-1D. Interaction between the pulses of accelerated particles from the source 415 and the material of the target set 420 produces a pulsed neutron beam. The source 412 may be a single-particle, single-energy accelerator. In some implementations, the source 412 may include more than one accelerator, each of which produces a different type of particle.

The target set 420 includes one or more materials that produce neutrons when struck by a pulse of accelerated particles from the source 415. The target set 420 may include multiple materials that are arranged along a single-piece track (such as the target ladder 220 shown in FIGS. 2A, 2B, 3A, and 3B). In some implementations, the target set 420 may be discrete targets that are physically separated from each other rather than being included in a single track. The target set 420 may include solid targets made of, for example, deuterium, beryllium, and/or carbon. In some implementations, the target set 420 may include gaseous targets, for example the target could be gaseous deuterium. The materials may be the same or the materials may be different from each other. In examples in which the materials in the target ladder 220 are different, the materials may be such that interactions between the different materials and the pulsed beam from the source 415 produce neutron beams of different energies (such as a "slow" neutron and a "fast" neutron).

The source system 410 also includes the beam steering module 420. The beam steering module 420 steers the beam from the source 415 with respect to the target set 420 such that the beam from the source 415 strikes a particular portion of the target set 420. Thus, the beam steering module 420 allows selection of the energy of the neutron beam produced by the interaction of the beam from the source 415 and the material within the target set 420. The beam steering module 420 may be a magnet that controls the direction of the beam. In some implementations, the steering module 420 acts to move the target set 420 with respect to the source and/or the physical region 405 or to move the source 415 with respect to the target set 420.

The source system 410 also includes the source electronics 430. The source electronics 430 provide timing for accelerating the pulses of particles from the source 415 and for controlling the steering module 420. For example, in implementations in which the steering module 420 is a magnet, and the beam from the source 415 is steered only when the magnet is activated, the source electronics 420 may activate and deactivate the magnet.

The source system 410 also includes a processor 435, an electronic storage 440, and an input/output module 445. The electronic storage 440 stores instructions, that when executed, cause a processor coupled to the source 415 to accelerate a pulse of particles toward the target set 425 or a particular portion of the target set 425. The electronic storage 440 also may include instructions that, when executed, cause the processor 435 controlling the steering module 420. Additionally, the electronic storage 440 may store predefined values that define the duration and frequency of the pulses of accelerated particles that are emitted from the source 415.

The electronic storage 435 is an electronic memory module, and the electronic storage 435 may be a non-volatile or persistent memory. The processor 430 may be a processor suitable for the execution of a computer program such as a general or special purpose microprocessor, and any one or more processors of any kind of digital computer. Generally, a processor receives instructions and data from a read-only memory or a random access memory or both. The processor 430 receives instruction and data from the components of the source system 410 and/or the sensor system 450, such as, for example, a location and/or other indication of the presence of a fissionable material within the physical region 405 that causes the source 415 and the steering module 420 to direct a pulse of accelerated particles toward the identified fissionable materials and a portion of the target set that includes a material that produces "slow" neutrons when struck by an accelerated particle. In some implementations, the source system 410 includes more than one processor.

The input/output module 445 may be any device or module able to transmit data to, and receive data from, the source system 410. For example, the input/output device 445 may be a mouse, a touch screen, a stylus, a keyboard, or any other device that enables a user to interact with the source system 410. In some implementations, the input/output module 445 may be configured to receive an input from an automated process or a machine and/or configured to provide an output to an automated process or a machine.

The system 400 also includes the sensor system 450. The sensor system 450 senses delayed fission products that emanate from the physical region 405 due to the irradiation of fissionable materials within the physical region 405 by the source system 410. The sensor system 450 includes a fission product sensor 460, an attenuation image sensor 465, sensor electronics 470, a processor 475, an electronic storage 480, and an input/output module 485.

The fission product sensor 460 is sensitive to fission products emitted from the physical region 405 in response to being irradiated with the "slow" or "fast" neutron beams emitted from the target set 425. The fission product sensor 460 may be an array of scintillators that detect treed neutrons and/or gamma rays. For example, the fission product sensor 460 may be liquid or plastic scintillators and/or germanium (Ge) or high-performance germanium (HPGe) detectors.

The sensor system 450 also includes the attenuation imaging sensor 465. The imaging system 465 may be similar to the imaging sensor 132 discussed above. The imaging sensor 465 is a sensor configured to generate an image of the attenuation of the "fast" neutron beam that is caused by the "fast" neutron beam traveling through the physical region 405. The imaging sensor 465 includes read-out electronics (not shown) that provide an electrical signal proportional to the radiation received by the imaging sensor 465. The imaging sensor 465 may be, for example, a plastic scintillator. The imaging sensor 465 is placed in the path of the neutron beam such that the imaging sensor produces an image of the physical region 405. The imaging sensor 465 may generate the image of the physical region 405 by building up an image from images of slices of the physical region 405. As compared to the fission product sensor 460, the imaging sensor 465 may have a smaller active sensing area.

The sensor electronics 470 include electronics for powering and controlling the sensor system 450. For example, the sensor electronics 470 may control the fission product sensor 460 such that the fission product sensor 470 is inactive while the physical region 405 is irradiated with the pulsed neutron beam from the source 405 and is activated after a time corresponding to the time for the prompt fission products to subside.

The sensor system 450 also includes a processor 475, an electronic storage 480, and an input/output module 485. The electronic storage 480 stores instructions, that when executed, cause the processor 475 to determine a number of counts of fission products sensed by the fission product sensor 460 or an amount of energy sensed by the fission product sensor 460. If the amount of energy exceeds a predefined threshold, the sensor system 450 may produce an alarm that is perceivable to an operator of the system 400 and/or the sensor system may provide a location of the source of the energy to the source system 410 such that the source system 410 may perform a confirmation scan of the location.

The electronic storage 480 may store a pre-determined threshold value for an amount of energy or a count of fission products above which a fissionable material and/or special nuclear material is identified. The threshold value may represent a background level of fission products that is expected to be detected regardless of whether fissionable materials are present. The electronic storage 480 also includes instructions, that when executed, cause the processor 475 to determine a location corresponding to an identified fissionable material and to provide the location to the source system 410.

The electronic storage 480 is an electronic memory module, and the electronic storage 480 may be a non-volatile or persistent memory. The processor 475 may be a processor suitable for the execution of a computer program such as a general or special purpose microprocessor, and any one or more processors of any kind of digital computer. Generally, a processor receives instructions and data from a read-only memory or a random access memory or both. In some implementations, the sensor system 450 includes more than one processor.

The input/output module 485 may be any device or module able to transmit data to, and receive data from, the sensor system 450. For example, the input/output module 485 may be a mouse, a touch screen, a stylus, a keyboard, a display device, or any other device that enables a user to interact with the sensor system 450 or with data produced by the sensor system 450. In some implementations, the input/output module 485 may be configured to receive an input from an automated process or a machine and/or configured to provide an output to an automated process or a machine.

Figure 5:
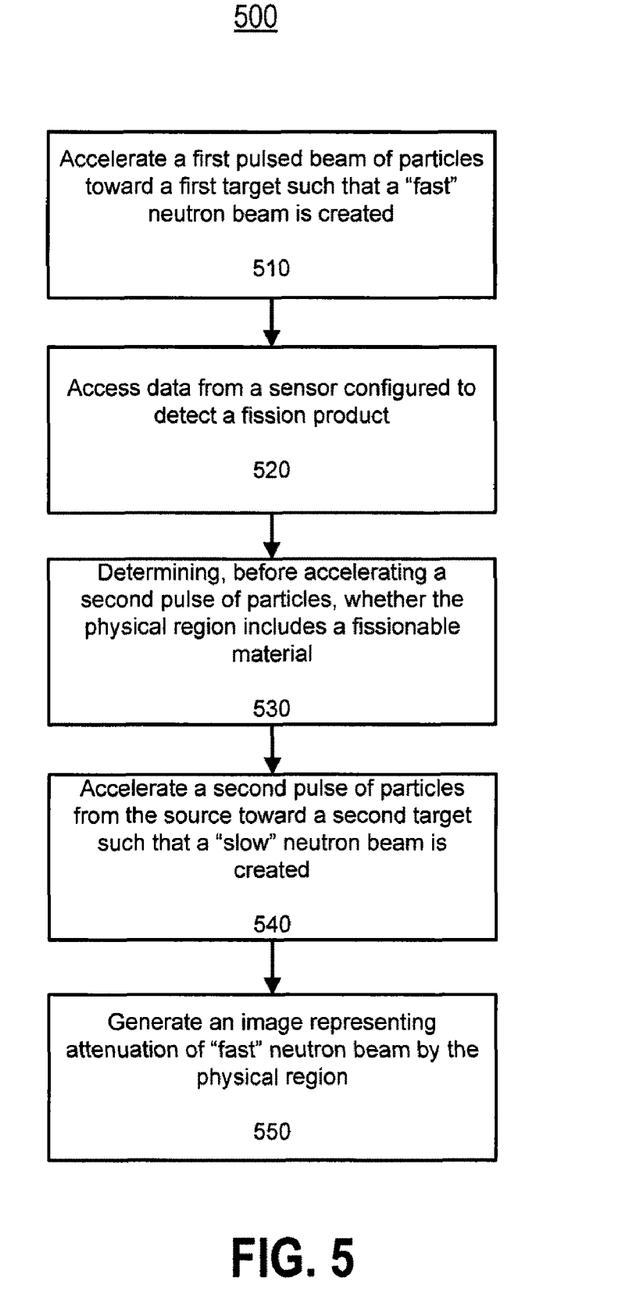
FIG. 5 shows an example process for distinguishing between classes of fissionable materials.

FIG. 5 shows an example process 500 for distinguishing between fissionable materials and specific types of fissionable materials, such as special nuclear materials. The process 500 may be performed by one or more processors included in a system that uses a dual-energy neutron beam to distinguish between fissionable materials from special nuclear materials. For example, the process 500 may be performed by a system such as the systems 100, 200, 300, or 400 discussed above.

A first pulsed beam of charged particles is accelerated toward a first target such that a "fast" neutron beam is created (510). The pulsed beam of particles may include particles such as deuterons, protons, or ions. The first target is a material, such as beryllium or deuterium, that produces neutrons in response to being struck by an accelerated particle. The "fast" neutron beam travels toward a physical region and interacts with materials within the physical region. The physical region may be, for example, an open space inside of or on a container used to transport goods and capable of hiding contraband, such as a truck, a shipping container, a rail container, an automobile, or an airplane cargo or passenger hold. The physical region may be a space in or on a smaller, hand-portable item such as a purse, a suitcase, or a trunk. The "fast" neutron beam includes neutrons having sufficient energy to penetrate the walls of the container and to travel through the container to interact with the objects in the physical space.

The neutrons included in the "fast" neutron beam also have sufficient energy to cause fission in fissionable materials. Thus, the interaction of the "fast" neutron beam and fissionable materials causes the production of fission products (e.g., freed neutrons and/or gamma rays). In some implementations, a region of interest within the physical region may be identified prior to the acceleration of the pulsed beam of particles toward the first target. The region of interest may be a region of the physical region that was automatically identified in an earlier scan as possibly including fissionable materials, or the region of interest may be a location that was identified by a person observing the container with a radiation monitor. The region of interest may be a location that was identified with a different screening system.

Data from a sensor that is configured to detect fission products is accessed (520). The sensor may be, for example, a sensor such as the fission product sensor 460 discussed with respect to FIG. 4 that senses the products of fission that are present after a time (e.g., 10 ms) that is sufficient to allow prompt fission products to subside once the incident "fast" neutron beam is removed. The data accessed from the sensor may include a count or other measure (such as an amount of energy sensed) of the amount of fission products sensed during a particular time measured with respect to the end of the incident "fast" neutron beam. For example, the data may represent an indication of the detection of delayed fission products. The data in the sensor may be accessed by accessing an electronic storage associated with the sensor (such as the electronic storage 480), by transferring the data to a source system such as the source system 410, and/or by presenting the data to an operator of a system that distinguishes between fissionable materials and special nuclear materials.

Whether the physical region includes fissionable materials is determined before accelerating a second pulsed beam of particles (530). Whether the physical region includes fissionable materials may be determined based on the data from the sensor. The presence of fissionable materials is determined before another pulse of particles is accelerated from the source, thus, the presence of the fissionable products is detected between accelerator pulses.

A second pulse of particles (such as deuterons) is accelerated from the source to a second target such that a "slow" neutron beam is created (540). The second target may be a material that produces a "slow" neutron beam in response to being struck by the pulsed beam of accelerated particles. The second target may be made from carbon, for example. The "slow" neutron beam enters the physical region and interacts with the materials in the physical region. The "slow" neutron beam has energy sufficient to cause fission in special nuclear materials and some other weaponizable materials, but not in all fissionable materials. Thus, if a material produces fissionable products in response to interacting with the "slow" neutron beam, the material is most likely a special nuclear material. An alarm may be triggered if a special nuclear material is detected. Accordingly, by causing interactions between a "slow" neutron beam and a "fast" neutron beam, the system may distinguish between fissionable materials and special nuclear materials. In some implementations, the "slow" neutron beam is produced only if fission products are sensed as a result of irradiating the physical region with the "fast" neutron beam.

An image that represents attenuation of the "fast" neutron beam by the physical region is generated (550). As discussed above, images of the physical region's attenuation of the "fast" neutron beam may show regions of the physical region that neutrons do not penetrate. These regions may include very dense materials that are often used to shield nuclear (or other hazardous) materials. Thus, the regions showing non-penetration are of interest because they may include materials of interest. The attenuation image may be generated after scanning the entire physical region. The regions of non-penetration may show up as dark regions. The attenuation image may be analyzed for the regions of non-penetration by, for example, applying an edge-detection algorithm to the attenuation image to look for sharp changes in intensity and/or by applying a threshold to the image to find regions of low intensity. In some implementations, the attenuation image may be presented to an operator for visual inspection. For example, the attenuation image may be presented to an operator of the system 400 on a display device included in the input/output module 485. In some implementations, the attenuation image may be provided to an automated process.

Products of fission that are sensed in subsequent cycles of exposure to the pulsed dual-energy neutron beam may be stored and accumulated for further processing and analysis. In some implementations, the dual-energy neutron beam may include multiple pulses of the "slow" neutron beam after a pulse of the "fast" neutron beam, and the fission products resulting from the fission caused by the "slow" neutron beam may be accumulated over time.

A number of implementations have been described. Nonetheless, it is understood that other implementations are within the scope of the claims.

What is claimed is:

1. A system for detecting fissionable material, the system comprising:
    a source configured to accelerate a pulsed beam of charged particles;
    a first target configured to generate a first neutron beam in response to being struck by accelerated charged particles, the first neutron beam including neutrons having a first energy that is sufficient to cause fission in a first class of fissionable material, wherein said first class of fissionable material is non-weaponizable fissionable material;
    a second target configured to generate a second neutron beam in response to being struck by accelerated charged particles, the second neutron beam including essentially only neutrons having a second energy that is lower than the first energy, the second energy sufficient to cause fission in a second class of fissionable material, wherein said second class of fissionable material is weaponizable fissionable material, and insufficient to cause fission in the first class of fissionable material;
    a sensor configured to detect radiation from a fission product; and
    a processor coupled to a non-transitory computer-readable storage medium, the medium storing instructions that, when executed, cause the processor to:
        cause the source to accelerate a first pulsed beam of charged particles toward the first target such that the first neutron beam is directed toward a physical region,
        cause the source to accelerate a second pulsed beam of charged particles toward the second target such that the second neutron beam is directed toward the physical region,
        determine, based on data from the sensor, whether the physical region includes a fissionable material, and
        in response to a determination that the physical region includes a fissionable material determine whether the fissionable material is part of the first class of fissionable material or the second class of fissionable material based on the data from the sensor.

2. The system of claim 1, wherein the instructions further cause the processor to receive a region of interest that is located within the physical region.

3. The system of claim 1, wherein the second pulsed beam of charged particles has the same energy as the particles in the first pulsed beam of charged particles.

4. The system of claim 1, further comprising a steering module configured to steer an accelerated pulsed beam of charged particles relative to the first target and the second target.

5. The system of claim 4, wherein the steering module is a magnet configured to control a direction of the first pulse.

6. The system of claim 4, wherein the first target and the second target are spatially separated from each other, and the steering module steers the first pulse of charged particles to the first target to generate the first neutron beam and the second pulse of charged particles to the second target to generate the second neutron beam.

7. The system of claim 1, wherein the first target and the second target are located along a target ladder that is a single piece.

8. The system of claim 1, wherein the first target and the second target are the same material.

9. The system of claim 1, wherein the first target is beryllium or deuterium, and the second target is carbon.

10. The system of claim 1, further comprising a track along which the source moves relative to a region that includes the physical region.

11. The system of claim 1, wherein the system is configured such that the data of the sensor is analyzed for the presence of delayed fission products.

12. The system of claim 11, wherein the sensor is activated only when the physical region is not irradiated by the first neutron beam or the second neutron beam.

13. The system of claim 1, further comprising an imaging sensor placed in the path of one or more of the first neutron beam and the second neutron beam.

14. The system of claim 1, wherein the source is a single energy accelerator.

15. The system of claim 1, wherein the first neutron beam is a fast neutron beam that includes neutrons having an energy greater than a threshold energy, and the second neutron beam is a slow neutron beam having neutrons having an energy less than the threshold energy.

16. The system of claim 15, wherein the instructions further include instructions to cause the processor to generate an image based on attenuation of the fast neutron beam by the physical region.

17. The system of claim 16, wherein the instructions further include instructions to analyze the generated image to identify regions that are not penetrated by the fast neutron beam.

18. The system of claim 15, wherein the processor is further configured to:
    receive data from the sensor indicating detection of fission radiation resulting from the slow neutron interacting with the physical region, and
    determine that the region of interest includes a weaponizable material based on the data.

19. The system of claim 15, wherein at least one neutron included in the fast neutron beam has an energy greater than 1.5 MeV, and the slow neutron beam has neutrons having an energy of less than 1.5 MeV.

20. The system of claim 15, wherein the slow neutron beam only has neutrons having an energy less than the threshold energy.

21. The system of claim 15, wherein the weaponizable material comprises a special nuclear material, and the second class of fissionable material comprises uranium-238.

22. The system of claim 15, wherein the threshold energy is about 1.2 MeV.

23. The system of claim 15, wherein the fast neutron beam further includes neutrons below 0.5 MeV.

* * * * *

UNITED STATES PATENT AND TRADEMARK OFFICE
CERTIFICATE OF CORRECTION

PATENT NO. : 8,345,812 B2
APPLICATION NO. : 12/426172
DATED : January 1, 2013
INVENTOR(S) : David Perticone et al.

It is certified that error appears in the above-identified patent and that said Letters Patent is hereby corrected as shown below:

On the Title page, under "(57) ABSTRACT," Col. 2, line 5 of the Abstract, replace "last" with --fast--.

At Col. 14, lines 26-27, claim 13, replace "one or more of the first neutron beam and the second neutron beam," with --the first neutron beam--.

Signed and Sealed this
Nineteenth Day of March, 2013

Teresa Stanek Rea
*Acting Director of the United States Patent and Trademark Office*